(12) United States Patent
Cairns

(10) Patent No.: US 11,347,933 B1
(45) Date of Patent: *May 31, 2022

(54) DISTRIBUTED COLLABORATIVE STORAGE WITH OPERATIONAL TRANSFORMATION

(71) Applicant: Google LLC, Mountain View, CA (US)

(72) Inventor: Brian Lewis Cairns, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,885

(22) Filed: Jan. 25, 2021

Related U.S. Application Data

(63) Continuation of application No. 14/984,432, filed on Dec. 30, 2015, now Pat. No. 10,902,185.

(51) Int. Cl.
| | |
|---|---|
| *G06F 17/00* | (2019.01) |
| *G06F 40/166* | (2020.01) |
| *G06F 40/197* | (2020.01) |
| *G06F 40/151* | (2020.01) |
| *G06F 16/93* | (2019.01) |
| *G06F 16/23* | (2019.01) |
| *G06F 40/123* | (2020.01) |

(52) U.S. Cl.
CPC ........ *G06F 40/151* (2020.01); *G06F 16/2308* (2019.01); *G06F 16/93* (2019.01); *G06F 40/123* (2020.01); *G06F 40/166* (2020.01); *G06F 40/197* (2020.01)

(58) Field of Classification Search
CPC .... G06F 40/151; G06F 16/93; G06F 16/2308; G06F 40/166; G06F 40/123; G06F 40/197

USPC .................................................. 715/229, 200
See application file for complete search history.

(56) References Cited

U.S. PATENT DOCUMENTS

| | | |
|---|---|---|
| 5,734,898 A | 3/1998 | He |
| 5,864,837 A | 1/1999 | Maimone |
| 7,933,952 B2 | 4/2011 | Parker et al. |
| 7,941,399 B2 | 5/2011 | Bailor |
| 8,019,780 B1 | 9/2011 | Pinkerton |
| 8,370,628 B2 | 2/2013 | Mundy |
| 8,417,666 B2 | 4/2013 | Bailor |
| 8,434,002 B1 * | 4/2013 | Shah ...................... G06F 40/106 715/255 |
| 8,484,292 B2 | 7/2013 | Spataro et al. |
| 8,533,165 B2 | 9/2013 | Akinyemi et al. |
| 8,635,271 B1 | 1/2014 | Adya et al. |
| 8,639,659 B2 | 1/2014 | Ishihara et al. |
| 8,738,706 B1 | 5/2014 | Grieve et al. |

(Continued)

*Primary Examiner* — Manglesh M Patel
(74) *Attorney, Agent, or Firm* — Lowenstein Sandler LLP

(57) ABSTRACT

Systems and methods are disclosed herein for performing operational transforms on a document. A first operation is received at a first server that includes a first object of an electronic document. In response to receiving the first operation, the first server prohibits a second server from having write access to the first object. The first server applies the first operation to the first object to obtain a transformed first object. In response to obtaining the transformed first object, the first server allows the second server to have write access to the first object. These steps are repeated for a second object associated with a second portion of the electronic document that is different from the first portion of the electronic document.

19 Claims, 8 Drawing Sheets

(56) References Cited

U.S. PATENT DOCUMENTS

| | | |
|---|---|---|
| 9,529,785 B2 | 12/2016 | Vagell et al. |
| 10,133,716 B2 | 11/2018 | Konnola et al. |
| 2007/0094312 A1 | 4/2007 | Sim-Tang |
| 2007/0226320 A1 | 9/2007 | Hager et al. |
| 2008/0172607 A1 | 7/2008 | Baer |
| 2009/0094242 A1 | 4/2009 | Lo |
| 2009/0327358 A1 | 12/2009 | Lukiyanov et al. |
| 2011/0055329 A1 | 3/2011 | Abt, Jr. et al. |
| 2012/0101980 A1 | 4/2012 | Taleghani et al. |
| 2015/0195311 A1 | 7/2015 | Lemonik et al. |
| 2016/0006805 A1 | 1/2016 | Ulupinar et al. |

\* cited by examiner

| FILE ID | OBJECT ID | OBJECT VERSION NUMBER | TIMESTAMP | CLIENT ID | CLIENT SEQUENCE NUMBER |
|---|---|---|---|---|---|
| 1254 | A123 | 3 | 24-AUG-2015/ 21:23:59 | 9817 | 0787 |
| 574 | B245 | 1 | 24-AUG-2015/ 23:00:09 | 5692 | 5457 |
| 687 | C965 | 4 | 22-AUG-2015/ 07:40:45 | 2156 | 6452 |
| 1345 | D854 | 5 | 24-SEP-2015/ 13:00:59 | 8475 | 3323 |

200

DISTRIBUTED COLLABORATIVE STORAGE WITH OPERATIONAL TRANSFORMATION

RELATED APPLICATIONS

This application is a continuation application of co-pending U.S. patent application Ser. No. 14/984,432, filed Dec. 30, 2015, which is herein incorporated by reference.

BACKGROUND

Existing online document processing services allow users to create and share documents via the Internet and store the documents at a remote location. Typically, users access an online document processing service using a web browser operating on a computer or other device. Multiple users can access the document from any location, using a computer or other device that has access to the Internet.

While existing online document processing services enable multiple users to access and edit a document remotely, these services offer limited conflict resolution capabilities in the case of conflicting edits. A need exists for an online document processing service that enables resolution of conflicts created by the edits of multiple users with access to a document. For example, a first user may select to perform an edit of a first region of the document and a second user may perform an edit of a second region of the document overlapping the first region. In order for all collaborators to have a common (i.e., consistent) document, such conflicts should be resolved.

SUMMARY

Systems and methods are disclosed herein for performing operational transforms on a document. According to one aspect, a first operation and a second operation is received at a first server that includes a first object of an electronic document. In response to receiving the first operation, the first server prohibits a second server from having write access to the first object. The first server transforms the second operation against the first operation to the first object to obtain a transformed operation. In response to obtaining the transformed operation, first server allows the second server to have write access to the first object and this process is repeated for a third operation and a fourth operation associated with a second portion of the electronic document that is different from the first portion of the electronic document.

Another aspect relates to a system including means for receiving a first operation and a second operation at a first server that includes a first object of an electronic document. In response to receiving the first operation, the server prohibits a second server from having write access to the first object. The system further comprises means for a first server to transform the second operation against the first operation to obtain a transformed operation, means for obtaining the transformed operation and means for the first server to allow the second server to have write access to the first object. Finally, this is repeated for a second object associated with a second portion of the electronic document that is different from the first portion of the electronic document.

In some implementations, the system further comprises means for the electronic document to contain a first chunk that contains a first object and a second chunk that contains a second object, where the size of the chunk is predetermined on at least one of a concurrency factor and an overhead factor. In some implementations, the system further comprises means for the size of the chunk to be based on a concurrency factor which is related to a speed with which write access is allowed and an overhead factor which is related to the cost of storing chunk metadata for the chunk. In some implementations, the system further comprises means for associating a first object and a second object with metadata including a version number, object identifier, operation history and timestamp. In some implementations, the system further comprises the version number associated with the first object is updated when the first object is affected by the first operation.

In some implementations, the system further comprises means for receiving a first version number, at the server, of the first object along with the first operation. A server version of the first object is stored at the first server that has a second version number associated with the object. In some implementations, the system further comprises means for the first server to compare the first version number to the second version number to determine whether to apply the first operation to the server version of the first object. In some implementations, the system further comprises means for the first server and second server to request for write access to the first object until write access is provided to add an operation to an operation history associated with the first object, wherein acquiring write access by the first server prohibits the second server from transforming operations associated with the first object, and wherein the operation history of the first object is a complete list of operations applied to the first object.

In some implementations the system further comprises means for receiving a sync request at a first server with the first object identifier associated with a first version of the first object to be updated and the first server processes the operation history of a second version of the first object and filters the operation history of the first object to obtain a set of operations that have not been applied to the first version of the first object but have been applied to the second version of the first object. In some implementations, the system further comprises means for the first server to store a snapshot of the first object, where the snapshot is obtained by applying the first operation to the first object and in response to a read request, the first server checks for the presence of the snapshot of the first object before applying the first operation made to the first object.

In some implementations, operational transforms are performed on a document. According to one aspect, a first operation and a second operation is received at a first server that includes a first object of an electronic document. In response to receiving the first operation, the first server prohibits a second server from having write access to the first object. The first server transforms the second operation against the first operation to obtain a transformed operation. In response to obtaining the transformed first object, first server allows the second server to have write access to the first object and this process is repeated for a second object associated with a second portion of the electronic document that is different from the first portion of the electronic document.

DETAILED DESCRIPTION

Figure 1:
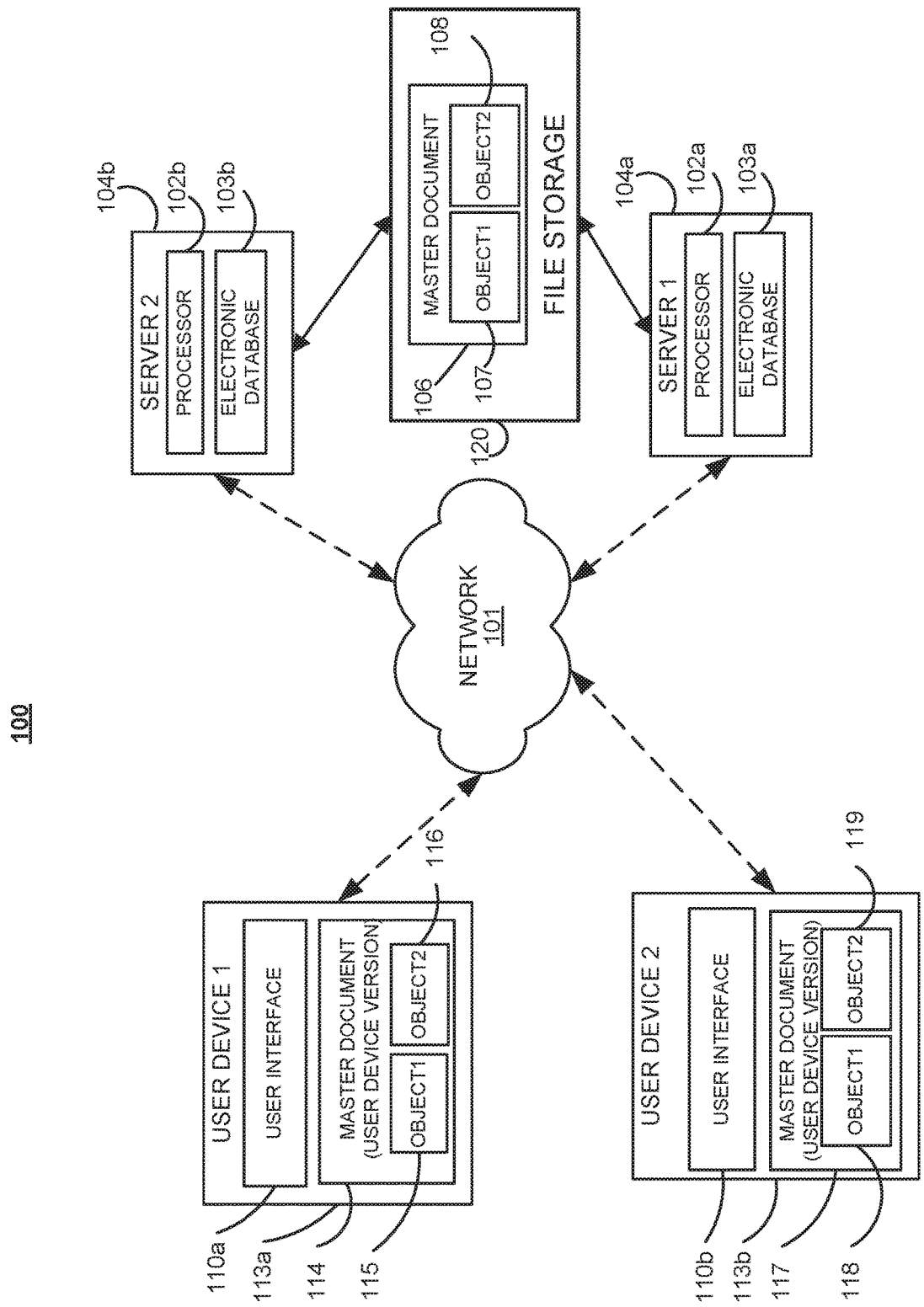
FIG. 1 is a block diagram of a computerized system for integrating collaboratively proposed changes in an electronic document, according to an illustrative embodiment.

FIG. 1 is a block diagram of a computerized system 100 for integrating collaboratively proposed changes in an electronic document, according to an illustrative embodiment. The system 100 includes two servers 104a and 104b (generally, server 104), and two user devices 113a and 113b (generally, user device 113) that communicate with one another over a network 101. The servers 104a and 104b include a processor 102a and 102b (generally, processor 102) respectively, each of which manages updates to a master document 106 stored at a file storage location 120.

As is depicted in FIG. 1, users at the user devices 113a and 113b may simultaneously interact with the master document 106 over user interfaces 110a and 110b respectively. Each user device 113a and 113b may include a device such as a personal computer, a laptop computer, a tablet, a smartphone, a personal digital assistant, or any other suitable type of computer of communication device. Users at the user devices access and receive information from the servers 104a and 104b over the network 101. The user devices 113a and 113b may include components, such as an input device and an output device. A user may authenticate with the server 104a or 104b by inputting a username and password (or providing other identification information) via a user interface 110a or 110b, such that the same user device 113 may be used by different users at different times.

In an example, the processor 102a is configured to transmit and receive data over the network 101 in communication with the user device 113a. In particular, the processor 102a receives data indicative of changes that a first user at the user device 113a wishes to suggest to the master document 106. The processor 102b receives data indicative of changes that a second user at the user device 113b wishes to suggest to the master document 106. As would be understood by one of ordinary skill, based on the disclosure and teachings herein, the operations to the master document 106 may come from one or more of such user devices 113 as shown in FIG. 1. It is also possible that the server 104a receives operations from the user device 113a before, after or at substantially the same time as operations from the user device 113b, as is described in detail below.

The servers 104a and 104b provide updates and maintain synchronization of a master document 106. The master document 106 includes a set of components referred to herein as objects 107 and 108, which may be similarly or equally sized. One of ordinary skill in the art will understand that FIG. 1 is shown for illustrative purposes only and that a master document 106 is not limited to only including two objects and generally may include any number of objects. In one example, when the master document 106 is a text document having multiple paragraphs, each paragraph may be included in a different object of the master document 106. In another example, the master document 106 is a presentation document having multiple slides, and each slide may be included in a different object of the master document 106. The size(s) of the objects of the master document 106 may be determined by a developer of the software application responsible for creating, editing, and/or viewing the master document 106. In particular, the developer may select an appropriate size for the objects or an appropriate function to set an object size at the time that the software application is created.

Having the master document 106 stored as a single file (as opposed to having the master document 106 divided into multiple objects 107 and 108) may be undesirable because the entirety of the file must be stored on a platform before the file may be properly opened by a software application. This may be undesirable when a user urgently wishes to view or modify only a portion of a large file because the user must wait until the entire file is transferred. In particular, if the master document 106 were stored as a single file, the user at the user device 113a may need to wait until the entire file is transferred over the network 101 to the user device 113a before being able to open and edit the master document 106.

Instead, having the master document 106 divided into multiple objects 107 and 108 effectively reduces the latency during a request by a user device 113 to access the master document 106. As is shown in FIG. 1, the user device 113a stores a version 114 of the master document 106. Just as the master document 106 includes two objects 107 and 108, the version 114 includes two objects 115 and 116, corresponding to the objects 107 and 108, respectively. Similarly, the user device 113b stores a version 117 of the master document 106, where the version 117 includes two objects 118 and 119, corresponding to the objects 107 and 108, respectively. In other words, the versions 115 and 118 are versions of the object 107 of the master document 106, and the versions 116 and 119 are versions of the object 108 of the master document. The different versions of the various objects of the master document 106 are used to accumulate user-suggested changes to the master document 106. These suggested changes are then sent to one of the servers 104a or 104b to be applied to the master document 106. Meanwhile, the user versions 114 and 117 of the master document 106 may be periodically synchronized with the master document 106 that is stored on the file storage 120, to reflect the changes being made by the multiple collaborative users. The application of the changes to the master document is discussed in detail in FIG. 3.

Figure 2:
FIG. 2 is an example data structure that stores data related to objects in a collaborative editing environment, according to an illustrated embodiment.

As is described in detail in relation to FIG. 2, each object in FIG. 1 may be associated with a version number, an object identifier, an object timestamp, or any other suitable information pertaining to the object. Each user device 113 maintains a version 114 or 117 of the master document 106. In general, one or more users may be associated with each user device 113. The users make changes to the versions 114 or 117 of the master document 106. These changes are stored locally on the user device 113 (e.g., within the objects 115 or 118 if a change to the corresponding portion of the master document 106 was made, or within the objects 116 or 119 if a change to the corresponding portion of the master document 106 was made) as operations that are later committed to the objects 107 and 108 in the file storage 120.

In particular, an operation made to the object 115 at the user device 113*a* may be tagged with a corresponding object identifier. When the user at the user device 113*a* transmits over the network 101 a request to save its version of the object 115 (i.e., commit the operation to the object 115 to the version of the master document 106 stored in the file storage 120), the operation is transmitted over the network 101 to the server 104*a*. After the operation is received by the server 104*a*, the server 104*a* determines that the operation is tagged with an object identifier corresponding to the object 115. The server 104*a* further identifies that the object 115 is one version of the object 107, and proceeds to transform the operation along with any other operations (such as those received from the user device 113*b* affecting the same object 107) to avoid any conflict between the various operations received from various user devices 113 that affect the same object 107. The server 104*a* then commits the transformed operation(s) to the history associated with the corresponding object 107, and the operations are propagated to the remainder of the user devices (e.g., the user device 113*b*) that have access to the master document 106 or a version thereof.

In the event that multiple operations arrive at the server 104*a* at substantially the same time, the server 104*a* records the timestamp that each operation is received and compares the timestamp of the first operation with that of all other operations. If the differences in the timestamps between the first operation and the other operations fall under a predetermined threshold, the operations may be said to have arrived at the server 104*a* at substantially the same time, or substantially simultaneously. As described in the present disclosure, a first operation and a second operation conflict if they include contradictory instructions on how to edit the master document 106. In particular, two operations may conflict if they require that one of the two operations must be modified in view of the other operation before the other operation is applied to the master document 106. The user devices 113*a* and 113*b* may transmit conflicting operations substantially simultaneously over the network 101. The server 104*a* resolves the conflict by applying an operational transform to one operation in view of the other operation to generate a transformed operation as shown in step 308 of FIG. 3. In an example, the server 104*a* receives a first operation to the object 115 from user device 113*a* and proceeds to apply the first operation to the history of the object 107. At substantially the same time, the server 104*a* receives a second operation to the object 118 from the user device 113*b*. Rather than simply automatically proceeding to apply the second operation to the history of the object 107, the server 104*a* first modifies the references to objects in the master document 106 in the second operation in view of the applied first operation. This process is known as an operational transform, and the subsequent operations generated are known as transformed operations. In an example, the master document 106 may contain a word "cat" and the collaborating users may be willing to edit the word substantially simultaneously to generate the word 'coast'. User at user device 113*a* may wish to insert the letter 's' at the third position of the word "cat" while user at user device 113*b* may substantially simultaneously look to insert the letter 'o' at the second position. If the edit of adding 'o' is performed before the edit of inserting 's', the intermediate word formed is now 'coat' and the 's' now has to be inserted in the fourth position of the word instead of the third position, keeping in mind that the 's' was supposed to be inserted in the third position of the word 'cat'. If the letter 's' is inserted at the third position even after 'o' is inserted at the first position, we end up with 'co sat' instead of the intended 'coast'. Thus the reference position of the edit of inserting 's' is modified in view of the edit of inserting 'o' by updating the insert position of 's' in view of the new operation. The process of updating the references of a second operation in view of a substantially simultaneous first operation is known as performing the operational transform of the two operations. The transformed operations are then committed to the operation history associated with the object 107 at the file storage 120. When the operation history is updated, the version number of the object 107 is updated to reflect the addition of the new operation. The transformed operations are then propagated to the remaining user devices 113 with access to the master document 106 (e.g., the user device 113*b*). The process of applying operations is discussed in detail in relation to FIG. 3.

The version number of the object 115 may be used to determine the sequence of updates to be committed to the operation history associated with object 107 when the object 107 is updated. When the server 104*a* receives a set of operations over the network 101, where the operations are tagged with the identifiers of the affected object 115, the server 104*a* compares the current version number of the object 107 at the file storage 120 to the version number in the tag. If the tagged version number is greater than the current version number, the server 104*a* commits all the operations associated with object 115 to the history of the object 107. In the case that the tagged version number is less than the current version number, the server 104*a* may aggregate the operations that have been committed to the operation history of the object 107 between the tagged version number to the current version number and sends these operations to the user device 113*a*. If the tagged version number is equal to the current version number, no changes take place.

In one embodiment, the server 104*a* controls the read and write accesses of the master document 106. Multiple user devices 113 may simultaneously have read access to the objects 107 and 108, but only one user device (e.g., the user device 113*a*) may have write access to one or both objects, so as to commit operations to the operation histories of the objects. In particular, while the user device 113*a* is editing the operation history of the object 107, the server 104*a* prohibits all other user devices 113 (e.g., the user device 113*b*) from committing or appending operations to the operation history of the object 107. For example, the server 104*a* may instigate a write lock to the object 107 for the user device 113*b*, which prohibits the user device 113 from modifying the operation history of the object 107. In particular, the write access prohibits any other server (e.g. 104*b*) from transforming or committing operations which are associated with the first object of the electronic document while the first server 104*a* is transforming or committing operations associated with the first object. Once all the operations sent by user device 113*a* have been committed to the operation history of object 107 at the file storage 120, the server 104*a* relinquishes the write lock to object 107 so that other operations may be added to the operation history of the object 107. This process is described in detail in relation to FIG. 3. As described herein, the division of the master document 106 into multiple objects 107 and 108 (and the storage of various versions of these objects at the user devices 113) allows the server 104*a* to provide multiple user devices 113 with write access to differing objects of the same master document 106.

Users interact with the server 104*a* or 104*b* to create, modify, and/or execute an online document by collaboratively proposing changes to the document 106. Although each is illustrated as a separate device in FIG. 1, the servers 104*a* and 104*b* may be implemented as, for example, a single computing device or as multiple distributed computing devices. The user interfaces 110*a* and 110*b* may include web browsers, such that the version 114 of the master document may be viewed with an application that displays the document within a web browser. In this arrangement, users do not need to install software locally to their user devices 113 to view and make changes to the document 106. When browsers or user interfaces are discussed herein, these terms are intended to refer to any program that allows a user to view and modify a document, regardless of whether the browser program is a standalone program or an embedded program, such as a browser program included as part of an operating system. The logic described herein can be implemented in hardware, software, firmware, or a combination thereof.

In an example, the master document 106 is a text document. One of skill in the art will understand that the features and concepts described herein may be applied in any type of collaborative document application, including, for example, spreadsheet applications, presentation applications, drawing applications, and others. Only two user devices 113, two servers 104, and one master document 106 are shown in FIG. 1 to avoid complicating the drawing; however the system 100 can also support multiple users, servers and documents of the same type. By allowing for efficient collaboration across a set of users proposing changes to a document, the system 100 offers significant advantages over a system in which reviewers independently propose changes to a master document 106.

The processor 102*a* may include a memory unit (not shown) that stores computer executable instructions, which are executed by the processor. The computer executable instructions may include instructions for receiving data over the network 101, determining a user type for a given user, making changes to the master document 106 stored on the file storage 120, and updating various versions of the master document 106 (e.g., the versions 114 and 117) at different user devices 113. As is shown in FIG. 1, the master document 106 is stored on the file storage 120, which is depicted as a separate device from the servers 104*a* and 104*b*. In general, the master document 106 may be stored in the electronic databases 103*a* and/or 103*b* of the servers 104. In general, any data described herein as being stored on the electronic database 103*a* and/or 103*b* may instead or additionally be stored in the file storage 120 or on a separate memory unit external to the servers 104*a* and 104*b*.

Moreover, the file storage 120 is depicted as storing a single master document 106. In general, the file storage 120 may store multiple documents of the same or different type, which may be accessed by the servers 104. In another example, the file storage 120 may be included within one or both of the servers 104*a* and 104*b*, without departing from the scope of the present disclosure. Alternatively, the file storage 120 may be located remotely from the servers 104*a* and 104*b*, and may with the servers 104 over the network 101.

FIG. 2 is an example data structure 200 that stores data related to collaboration according to an illustrated embodiment. The data structure 200 may be stored in the file storage 120, at one or both of the servers 104*a* and 104*b*, or at another location. Each row in the data structure 200 corresponds to a different object in a file. For each object, the data structure 200 stores a field entry for an object identifier, an object version number, a timestamp, a client id, and a client sequence number. The object identifier may include a unique string of letters, numbers, or both that is assigned to each object, and is a unique identifier used by the server 104*a* to differentiate the different objects within the master document 106 or across different documents. The file identifier may also include a unique string of letters, numbers or both that is assigned to each file. The file identifier is a unique identifier used by the server 104*a* to identify the document to which the corresponding object belongs.

The object version number associated with each object corresponds to an identifier composed of alphabets or numbers or both and is used by the server 104*a* to keep track of the various revisions made to each object. Every time a user associated with a user device 113*a* initiates a save request as described in FIG. 3, the version number associated with each object that has been edited by the user is incremented to reflect the addition of the recent operations. In particular, each user device 113 stores a version 115 or 118 of the object 107. The versions 115 or 118 may be periodically synchronized with the object 107 to reflect the changes made by multiple collaborative users at the user devices 113. The master document 106 and the user device 113*a* may have different version numbers associated with the same object identifier. When the user device 113*a* transmits operations to the version 115 to the server 104*a* (where the transmitted operations are tagged with the object identifier of the affected object 115), the tagged version number of the version 115 is larger than the current version number of the object 107. The server 104*a* compares the tagged version number to the current version number to determine the transformed operations that should be committed to the history of the object 107. This process is described in more detail in relation to FIG. 3.

The timestamp field entry keeps track of the time at which the last changes were made to the object. The client sequence number is used to order multiple operations affecting different objects but belonging to the same document or file. As an example, the object identifier A123 in data structure 200 may be related to an object that is part of a text document 1254. If a user at the user device 113*a* makes a change to the version 115 of the object A123, the version number of the object A123 at the user device 113*a* is incremented and the operations tagged with the object A123 are sent to the server 104*a*. The server 104*a* may then parse the data structure 200 to identify the original object A123 of the master document 1254, and compares the current version number (associated with the object A123 in the data structure 200) to the tagged version number (received with the operations from the user device 113*a*). If the tagged version number is greater than the current version number, the server 104*a* updates the operation history associated with the object A123 at the master document 1254. To do this, the server 104*a* transforms the operations received from user device 113*a* in view of operations received from other user devices 113 (e.g. 113*b*) and appends the transformed operations to the object history associated with object A123. The server 104*a* updates the timestamp associated with the object 107 to the time of latest edit made to the operation history associated with the object with identifier A123.

The server 104*a* may receive multiple types of requests from the user device 113*a*. One kind of request received by a server 104*a* is a read request. For example, the user device 113*a* may transmit a read request to the server 104*a* when the user wishes to open a version 114 of the first part of the master document 106. In response to the read request, the server 104*a* sends the operation history of those corresponding objects 107 and/or 108 (that have been requested by the user) to the user device 113a. The operation history is then applied to the versions of the objects 115 and/or 116 at the user device 113a to produce the latest version of the requested portion(s) of the document. In another example, a read request can also be generated if a user tries to access a second part of the master document 106 that has not yet been loaded on the user device 113a. In general, upon receiving a read request, the server 104a parses the data structure 200 to identify any object associated with the file identifier 574 and sends the latest operation history of the requested objects to the user device 113 that transmitted the request. This ensures that the versions of the objects at the user device 113 are updated, so that the user views the most recent version of the requested objects. In this manner, a document is split up into multiple objects corresponding to different portions of the document. Splitting a document into multiple objects allows the user to request only certain portions of a document and is particularly advantageous when the document is large and would take a long time to transfer over the network 101. By having the document split up into multiple objects, only the requested objects or portions of a document may be transferred over the network 101, thereby reducing the amount of time needed for the transfer.

Another type of request that may be received by server 104a is a sync request. A sync request is similar to a read request, except that the sync request may include a request update the objects that the user is currently accessing. In particular, the sync request may include a list of operations that have been added to the operation history of object 107 by other users associated with user devices 113. In an example, the sync request may be periodically generated by a user device 113a and automatically transmitted to the server 104a at regular intervals whenever the user device 113a accesses the document. The sync request may include the object identifier(s) of the relevant object(s) that the user device 113a is accessing and that are to be synchronized with the latest updates made by other users to the master document 106. Generally, the objects in a sync request correspond to those objects that the user wants to read or edit. Upon receiving such a request, the server 104a parses the data structure 200 and sends to the requesting user device 113 the latest operation history of the requested objects. This ensures that the version of the object at the user device 113 corresponds to the latest version, so that the user may view or edit the most recent version of the object. As will be understood by one of ordinary skill in the art, the table 200 shown in FIG. 2 is shown for illustrative purposes only, and additional fields or fewer fields may be included in the table 200 without departing from the scope of the present disclosure.

Figure 3:
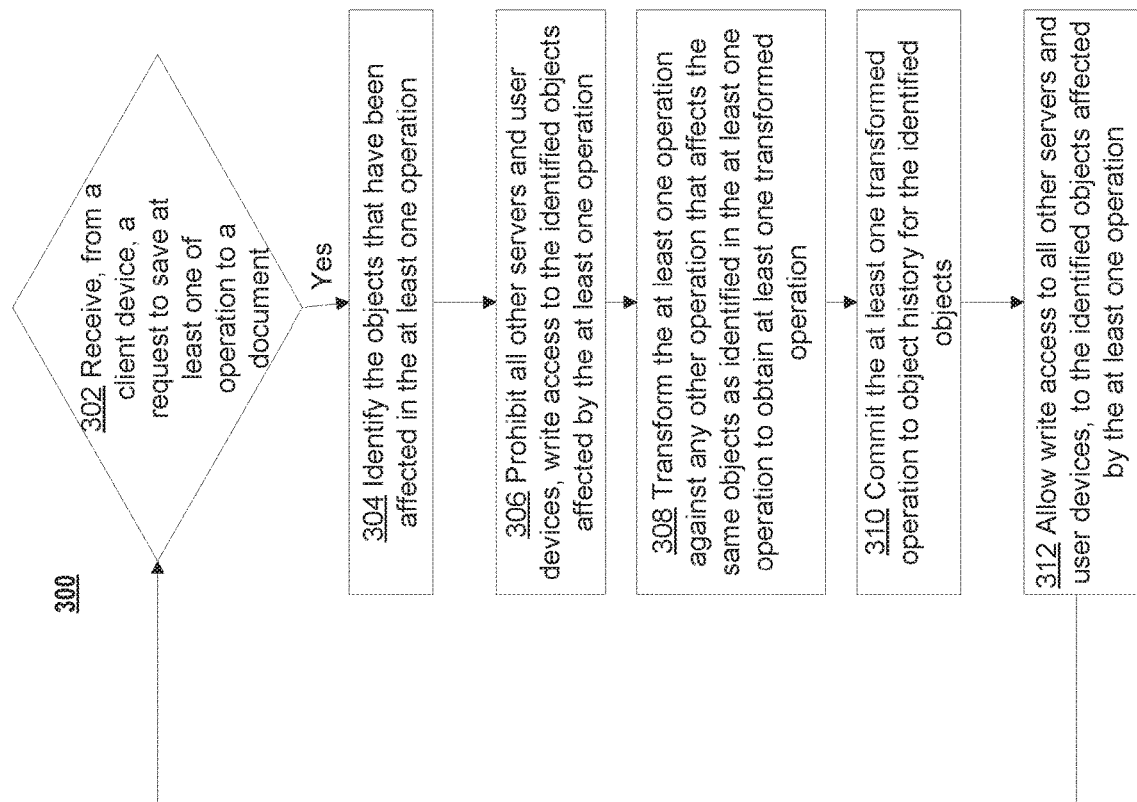
FIG. 3 is a flowchart of a method for initiating a save request to transform operations to a master document, according to an illustrative embodiment.

FIG. 3 is a flowchart of a process 300 that is performed by the server 104a to apply operations to the operation history of objects associated with master document 106 in response to initiation of a save request by the user at the user device 113a, according to an illustrative embodiment. The process of applying operations to the operation history of objects includes transforming the operations received against one or more previous operations affecting the first object of the electronic document. In an example, the server 104a applies operations that are received from the user device 113a. The server 104a propagates these operations to the other user devices (e.g., the user device 113b) that have access to the master document 106. The server 104a determines whether a save request is received from a client device (e.g., the user device 113a) to save at least one operation to an object 107 of master document 106 (decision block 302).

If so, the server 104a identifies the one or more objects that are affected by the at least one operation (step 304), prohibits other user devices 113 from having write access to the affected objects (step 306), transforms the at least one operation against any other operation that affects the same objects as identified at step 304 to obtain at least one transformed operation (step 308), commits the at least one transformed operation to the object history of the affected objects (step 310), and allows for other users associated with user device 113a or 113b to have write access to the affected objects (step 312).

At decision block 302, the server 104a receives request to save at least one operation from a client device (e.g., at least one of multiple user devices 113, such as the user device 113a). In an example, a user may make one operation to the object 115 at the user device 113a. The operation is tagged with the object identifier and version number of the object 115. The version number may have been incremented when the operation was made to the object 115 at the user device 113a.

At step 304, the server 104a identifies the objects that have been affected in the at least one operation. In particular, when an operation is received, the operation is examined to identify any objects that are tagged by the operation, objects e.g., any objects that are affected by the operation. In the above described example, the server 104a receives an operation that is tagged with the object identifiers of object 115. The server 104a determines that the tagged object 115 is a version of the object 107 stored on the file storage 120, and then parses the data structure 200 to identify the metadata associated with the objects 107 to extract the version number associated with the object to compare to the received version number of the same object identifier to understand if operations received from the user device 113a need to be committed to the operation history of the object 107. If the version number associated with the operation is more than the version number associated with the object 107 at data structure 200 at file storage 120, the received operations are committed to the history associated with object 107. If the version number at the file storage 120 is greater than the version number received with the operation, relevant operations are sent to user device 113a to keep the version 115 of object 107 updated for the user. If the version number of the operation is equal to the version number at the file storage 120, no changes take place.

At step 306, the server 104a prohibits all the other servers 104b and user devices 113b from obtaining write access to the object 107, which has been affected by the operation. This process may also be referred to herein as acquiring a lock on the object. In one embodiment, the acquisition of the lock prevents any other server from transforming or committing operations which are associated with the first object of the electronic document. In one embodiment, this is done by adding object 107 to a list of objects that have been locked by the server 104a to be edited only by one user device at one at a time. All other servers 104 and user devices 113 wait for their turn to gain access to object 107 to apply the operations to the operation history associated with object 107. Once the lock has been acquired, no other server 104b or user device 113b can obtain write access to the object until the lock is released by the server 104a.

At step 308, the server 104a transforms all the conflicting operations affecting the object that might have originated from one or more of the multiple users 113 to obtain transformed operations. The operational transform updates the references in the second operation in view of a simultaneously applied first operation before the second operation is applied to obtain desired results. The process of transforming operations is discussed in detail in relation to FIG. 2.

At step 310, the server 104a commits the transformed operations to the object history of the object 107. The history of the object 107 is used to update the different versions of the object 107 (e.g., the versions 115 and 118) when such an update is requested. Examples of such requests include a sync request or a read request that is transmitted from a user device 113. As described in relation to FIG. 1, a sync request may be periodically generated by the user device 113a to update one or both of the objects 115 and 116 that are being accessed by the user. The update is performed so that the versions of the objects that the user views reflect the latest changes made to their corresponding objects (e.g., the objects 107 and 108) by other users. In response to receiving a sync request the server 104a compares the version number of the object 107 stored at the file storage 120 to the version number of the object 115 stored at the user device 113a. If the version number at the file storage 120 is greater than the version number at the user device 113, the server 104a reads the operation history of the object 107 and sends the relevant operations to the user device 113a to update the version of the object 115 stored at the user device 113a. As is described in relation to FIG. 1, a read request is similar to a sync request, except a read request may be transmitted from a user device 113 to open one or more portions (e.g., associated with one or more objects) of a document. In contrast, a sync request may be periodically transmitted over the network 101 to update the user's version (e.g., by synchronizing it with the file storage version) after the user has already opened the desired portion(s).

At step 312, the server 104a releases the write lock to the object. This allows any one of the multiple users to gain write access to the object 107 to apply operations sent in by the user device 113. The server 104a that acquires the lock on the object 107 refuses access to object 107 to all other servers and user devices while the user device 113a makes one or more edits to the operation history of object 107. In one embodiment, this is done by adding object 107 to a list of objects that have been locked by the server 104a to be edited only by one user device at a time. Once the process of editing the operation history of object 107 by the user device 113a is complete, the server 104a removes the object 107 from the list of locked objects, thereby relinquishing the lock on the object 107 to allow other user devices and servers to edit the operation history of object 107.

Figure 4:
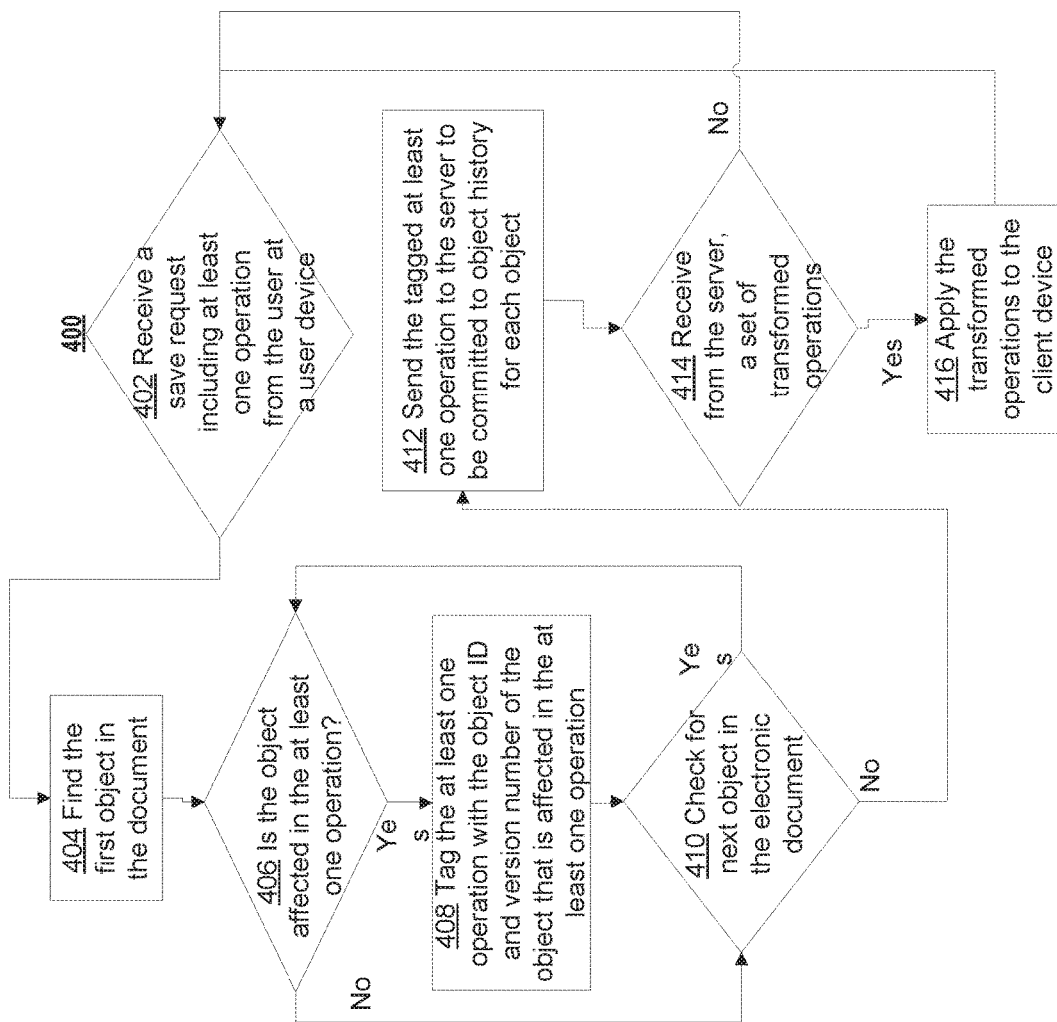
FIG. 4 is a flowchart of a method for initiating a save command to save one or more changes made a master document, according to an illustrative embodiment.

FIG. 4 is a flowchart of a process 400 that is performed by the user device 113a when the user device 113a receives a save request from a user to save at least one of the operations made to the version 114 of the master document 106, according to an illustrative embodiment. The user may make edits to the version 114 of the master document at the user device 113a. The changes to the version 114 are represented as operations to the versions of the objects 115 and/or 116, which are stored at the user device 113a. Once the user initiates a save request, the operations are then tagged with the affected objects 115 and/or 116, and sent to the server 104a to be committed to the operation history of corresponding objects 107 and/or 108 at the file storage 120. For example, when the only affected object on the user device 113a is the object 115, the operation is tagged with the object ID of the object 115 and is committed to the operation history of the corresponding object 107. Before committing the operations to the history of the object 107, the server 104a first ensures that there are no simultaneous conflicting operations made to the same object 107 by a user at the user device 113b. In the case of conflicting changes, the server 104a applies operational transforms to the operations, as is discussed in relation to FIG. 2. The transformed operations are sent back to the user devices 113a and 113b to update their respective versions 114 and 117 of the master document to reflect the latest changes.

The user device 113a determines whether a save request is received to save at least one of operation to made to the version 114 of the master document (decision block 402). If so, the user device 113a locates the first object in the document (step 404) and begins an iteration of all the objects 115 and 116 of the version 114 of the document, to check which objects are affected by the at least one operation (decision block 406). If the object is affected, the user device 113a tags the at least one operation with the object identifier of the affected object (step 408) and moves on to consider the next object in the version 114 (decision block 410). Once all objects have been considered, the tagged at least one operation is sent to the server 104a to be committed to the object history associated with the corresponding affected objects (step 412). If the user device 113a receives from the server 104a a set of transformed operations (decision block 414), these transformed operations are then applied to the object 115 (step 416).

At step 402, the user device 113a receives a save request containing edits to the version 114 of the master document made by a user at the user device 113a. The user device 113a records these changes as operations made to the version 114. The save request may be initiated by the user when the user wishes to commit the edits to the remote file storage 120, such that the edits are shared with the various other collaborating users who have access to the master document 106.

At step 404, the user device 113a finds the first object of the version 114 of the master document. In an embodiment, all of the objects of version 114 may be stored in a data structure similar to data structure 200 of FIG. 2. The data structure may be stored at the user device 113a, and may include all the objects of the version 114 of the master document 106 that are locally cached at the user device 113a. At decision block 406, the user device 113a determines if the selected object has been affected by the at least one operation. This is done so that identifiers of only those affected objects are sent to the server 104a. By indicating which objects are affected, this process effectively decreases the processing time at the server 104a to perform the process 300 to apply a set of operations to the operation history of an object associated with the master document 106. If the current object is affected, the process 400 proceeds to step 408, where the at least one operation is tagged with the identifier and version number of the affected object 115. Then, the next object is considered at decision block 406 until no objects remain in the version 114, as determined at decision block 410.

At step 412, the user device 113a sends the tagged at least one operation to the server 104a, so that the tagged operations may be committed to the operation history of the corresponding affected objects and accordingly distributed to other collaborating users. Before the server 104a commits the tagged operations to the history of the object 107, the server 104a checks for conflicting operations from another user for the same affected object 107. If such conflicting operations exist, the server 104a applies operational transforms (as discussed in relation to FIG. 2) to resolve the conflicts in the operations before committing the operations to the history of the affected object 107. The server 104a then sends these transformed operations to the collaborating users in order to keep the versions 115 and 118 of the objects updated.

At decision block 414, the user device 113a determines whether transformed operations are received from the server 104a. If so, the user device 113a applies the transformed operations to the affected local object 115 at step 416 before returning to the decision block 402. As described above, the transformed operations are generated if more than one user device are editing the same object 107 substantially simultaneously. As discussed in FIG. 2, the conflicting operations are transformed before they are applied to the operation history so that all the references in the operations are kept intact. These transformed operations, are then prorogated to the collaborating user devices to update the various versions 114 and 117 of the document that are stored at the various user devices 113.

Figure 5:
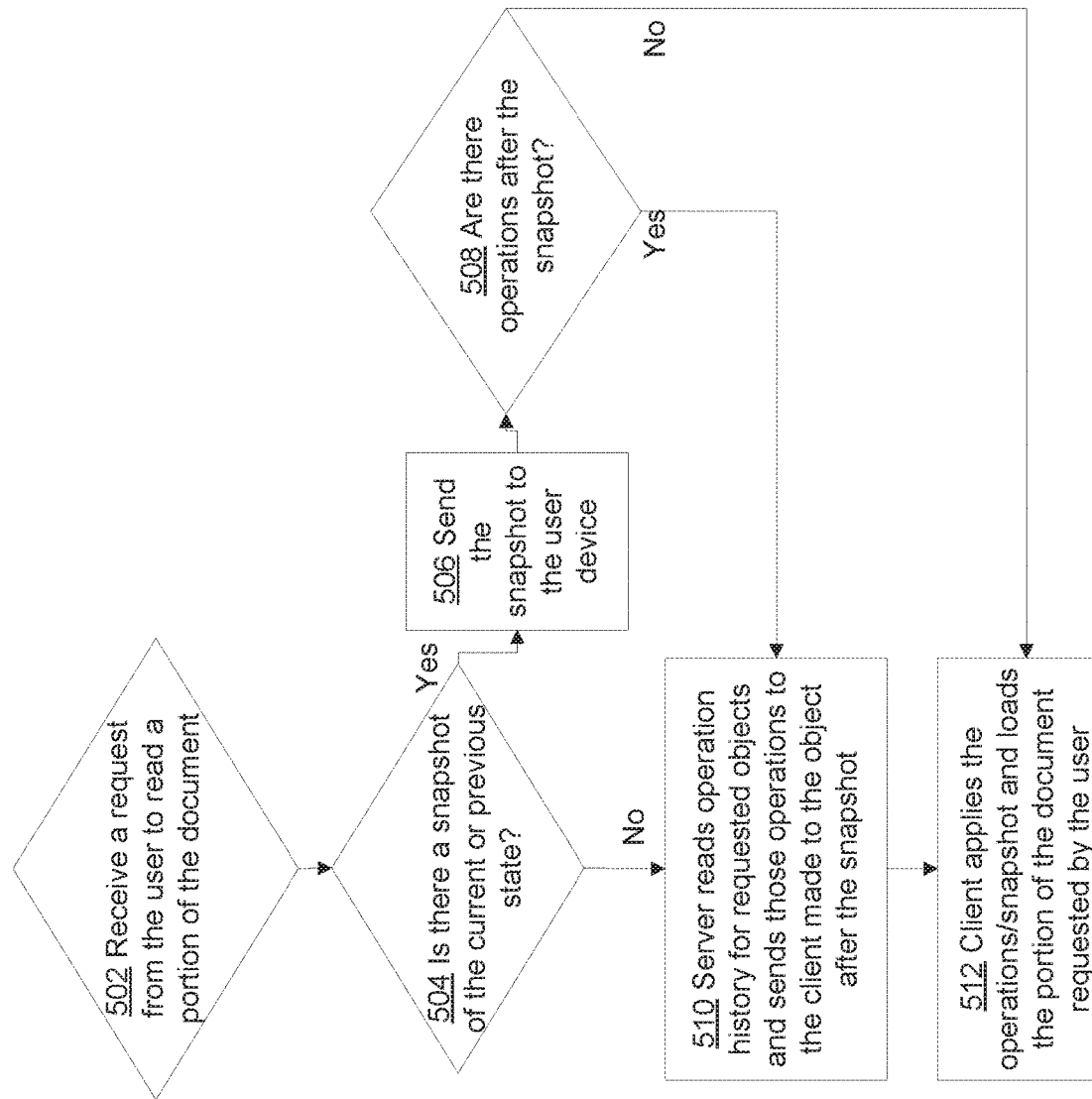
FIG. 5 is a flowchart of a method for receiving a request to read a portion of the master document, according to an illustrative embodiment.

FIG. 5 is a flowchart of a process 500 that is performed by the server 104a when the server 104a receives a request to read a portion of the master document 106, according to an illustrative embodiment. The server 104a can receive a request to read a portion of the document 106 from the user device 113a. The process and contents of a read request are discussed in detail in relation to FIG. 2. The requested portion may include one or more of the objects 107 and/or 108 of the master document 106. The server 104a determines whether a request to read a portion of the document is received (decision block 502). If so, then the server 104a determines that the object 107 is included within the requested portion, and executes or parses the entire operation history of the object 107 to reach the current state of the object 107. The current state of the object 107 may be referred to herein as a "snapshot" of the object, which is then sent to the user device 113a over the network 101. As additional edits are made to various versions of the object 107 at the user devices 113, the size of operation history associated with the object 107 grows. This means it takes longer for the server 104a to get to the current state of the object 107. To simplify the operation history associated with the object 107 of master document 106, the server 104a may periodically compress the operation history of the object 107 and store the current state of the object 107 as a snapshot. By compressing the operation history in this manner, the size of the history associated with the object 107 at the file storage 120 is decreased, which thereby reduces the load on the server 104a when processing a read request.

After receiving a read request, the server 104a checks if there are any existing snapshots of the requested portion of the document (decision block 504). If so, the snapshot is sent to the user device 113a (step 506). It is possible that even if the snapshot exists, more operations may have been added to the object history since the snapshot was taken. If post-snapshot operations are associated with the object 107 (decision block 508), the server 104a reads the operation history of the object 107 and sends the appropriate operations to the user device 113a (step 510). Alternatively, if no snapshot exists, the server 104a proceeds directly to read the operation history of the object 107 and send the operations that lead to the current state of the object 107 to the client device (step 510). The user device 113a applies the snapshot or operations and loads the requested portion of the master document 106 (step 512).

At decision block 502, the server 104a receives a request to read a portion of a master document 106 from a user. A read request may be generated when a user opens a document for the first time and may constitute a request to obtain the latest version of a requested portion of the master document 106. The requested portion of the master document 106 may include one or more objects of the document. For example, the master document 106 is large in size, such that it may be advantageous for the user device 113a to load only a portion of the document that would be useful for the user. In this case, after one portion of the document is loaded on the user device 113a, the user device 113a may continue to load other portions of the document. This process is discussed in further detail in relation to FIG. 6.

At decision block 504, the server 104a checks if there is an existing snapshot of the current state of the object 107. In particular, the server 104a may have determined that the object 107 constitutes at least a part of the requested portion. As described above, a snapshot is a compression of the operation history of the object 107 and represents the current state of the object 107. The current state of the object 107 is representative of all operations that have been applied to the object 107. Snapshots of the object 107 may be periodically saved to reduce the processing load on the server 104a. If a snapshot exists, the process 500 proceeds to step 506 to send the snapshot to the user device 113a, so that the version 114 of the document at the user device 113a may be updated with the latest changes made by collaborating users.

At decision block 508, the server 104a checks for additional operations or changes that have been made to operation history of object 107 since the snapshot was taken. If additional operations exist, those operations (along with the object identifier) are sent to the user device 113a at step 510. Otherwise, the process 500 proceeds to 512 where the snapshot is applied by the user device 113a.

At step 510, the server 104a reads the operation history of the objects to determine all of the changes that were made to the object 107 since the snapshot of the object was taken. All of the identified changes along with the object identifier are sent to user device 113a to update the version 115 of the object 107 and load the requested portion of the document at step 512. Alternatively, if no snapshots exist, the process 500 proceeds from decision block 504 directly to step 510, where the server 104a reads the operation history for the requested objects (e.g., the object 107) and sends the relevant operations to the user device 113a. Doing this allows the user device 113 to apply the operations to the locally cached version 115 of the object 107. At step 512, the user device 113a applies all of the received operations and/or snapshot(s) and loads the requested portion of the document 106 to the user.

In some embodiments, multiple objects (e.g., the objects 115 and 116) can be grouped together to form chunks or portions of a document. This process may involve assigning chunk IDs to the objects. In some embodiments, chunks may also be assigned before the server 104a proceeds to acquire write locks for different objects to perform the operational transforms. In some embodiments, every object is associated with a chunk ID when the object is created and all subsequent operations affecting that object may also be tagged with that chunk ID. Multiple objects may be assigned the same chunk ID, such that the multiple objects having the same chunk ID are grouped together as one chunk. The user may have the ability to assign one chunk ID to many different objects in a document. One reason to form chunks of a document is to reduce the number of read or sync requests sent by the user device 113a to the server 104a and to reduce the overall amount of traffic on server 104a. This effectively improves the processing capability of the server 104. In an example, the developer of the system 100 may determine whether to use chunks to group objects together when writing the code for the system 100. In some embodiments, it is preferable to assign chunk IDs to objects at the user device 113, and to not assign chunk IDs to objects at the server 104. For example, if the chunk IDs are assigned at the server 104*a*, the server may also need to rewrite the initial creation operation for the object and rewrite all subsequent operations affecting that object. In order to accomplish this, the server 104*a* has to maintain a mapping from object ID to chunk ID, in order relate the object ID received as part of a tagged operation, to the assigned chunk ID. Doing so may decrease the efficiency of the server 104*a* in processing objects and chunks. Alternatively, if chunk IDs are generated and assigned by the user device 113, the chunk ID is stored with the object on the user device 113*a* and is included as a tag on all subsequent operations affecting that object. In this case, the server 104*a* need not determine the chunk IDs for the objects, nor does the server 104*a* need to rewrite operations. This is because when the server 104*a* receives an operation tagged with a chunk ID of the affected chunk, the server 104*a* parses the chunk to obtain the object IDs of the objects that are a part of the chunk. The server 104*a* then proceeds to simultaneously lock all the objects part of the chunk in a single lock. This effectively reduces the number of save and sync requests that are transmitted by the user device 113, which in turn reduces the number of different locks that the server 104*a* acquires, thereby reducing the load on the server 104*a*. One of ordinary skill in the art will understand that a chunk is similar to an object 115, and the systems and methods described herein in relation to objects may also be accomplished with chunks. The chunk ID may be arbitrarily determined. For example, the chunk IDs may be generated randomly or sequentially, and multiple user devices 113*a* and 113*b* can use the same chunk ID to refer to the same or different groups of objects. For example, the same chunk ID may be used to represent different groupings of objects at the user device 113 (e.g. 115, 116, 117, 118). When chunks are used, all operations affecting an object may include that object's chunk ID along with the version number and object identifier. When operations tagged with the chunk ID are sent to the server 104*a*, the server may infer (from the chunk ID) the identifier of the objects within the current chunk, and processes the request using the inferred object identifiers. The chunk ID for an object may not change after that object is created. In one embodiment, chunk IDs may be chosen strategically to improve the chance that operations affecting multiple objects would all be a part of the same chunk, thereby decreasing the number of locks the server 104*a* needs to acquire. For example, all of the objects in a single document page or spreadsheet tab may have the same chunk ID, which would result in page/tab level locking and subsequently reduce the overall number of locks that the server 104*a* acquires.

In some embodiments, the chunk size is an implicit property of the document history and is defined when objects are created (which may take place on the client or the server). The size of the chunk presents a tradeoff between the number of access requests that are handled and the speed at which these requests are handled. This may be evaluated with the help of a concurrency factor (which represents the number of write access requests given out by the server 104*a* in a particular time interval) and an overhead cost (which represents the cost of storing each chunk at the user device 113*a*). These two factors may be used to determine an appropriate size of the chunks to group the objects 115 and 116 at the user device 113*a*. A smaller chunk size increases the number of access requests (i.e., the concurrency factor) and might lead to a backlog of requests at the server 104*a* for writing to the object operation history of objects 107 associated with the master document 106. But decreasing the size of the chunks would lead to an increased number of chunks for a document of the same size. The increased number of chunk sizes will also lead to increase in the overhead used to store the metadata per chunk. Alternatively, a relatively larger chunk size may decrease the number of requests for write access to the objects 107 and 108 of the master document 106 (i.e., the concurrency factor) and will lead to an increase in wait time for a different user to get write access to the same chunk of the master document 106. However, a relatively larger chunk size will also have less overhead in storing the metadata of the various chunks. In some embodiments, a chunk size may be selected to achieve a balance between the concurrency factor and the overhead. If every object has a unique chunk ID (e.g., if the chunk ID equals the object ID, or if it is universally unique) then the system behaves as the object-level locking system described herein.

Figure 6:
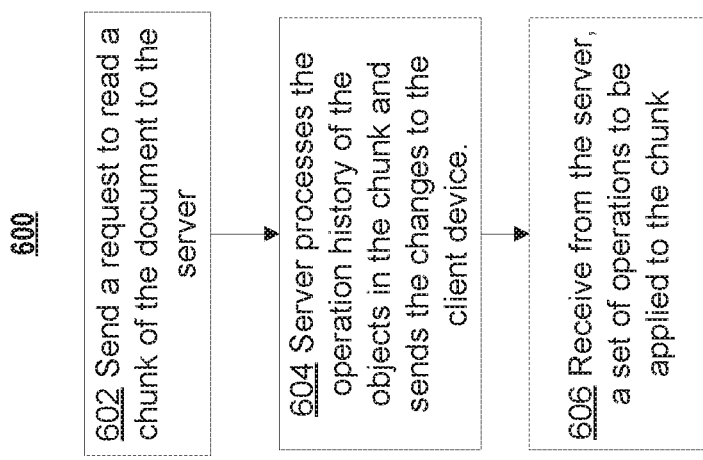
FIG. 6 is a flowchart of a method for receiving a request to read a chunk of the document, according to an illustrative embodiment.

FIG. 6 is a flowchart of a process 600 that is performed by the server 104*a* when receiving receives a request to read a chunk of the document, according to an illustrative embodiment. A user sends a request to read a chunk of the document to the server 104*a* (step 602), the server 104*a* processes the operation history of the objects in the chunk and sends the changes to the client (step 604), and the client receives the changes and applies the operations to the chunk (step 606).

At step 602, the user device 113*a* sends a request to read a chunk of the document. As discussed above, a chunk represents one or more objects at the user device 113*a*. The request to read the chunk may include the object identifiers of the one or more objects included within the chunk.

At step 604, the server 104*a* processes the operation history of the objects in the chunk and sends the changes to the client device. In particular, the server 104*a* receives a request from the user device 113*a* to read a chunk of the master document 106, identifies the individual objects 115 and 116 in the chunk and determines that they correspond to objects 107 and 108 of the master document 106. The server 104*a* then processes the operation histories of the objects 107 and 108 and sends the operations back to the user device 113*a*. In some embodiments, the meaning of a "chunk" is applicable only at the user devices 113, and the server 104 may interpret these requests as normal read or sync requests, as discussed in relation to FIGS. 2 and 3.

At step 606, the user device 113*a* receives the operations to the requested chunk, and applies the operations to obtain the latest version of the chunk. The received operations are based on the objects that are part of the chunk, and the user device 113*a* groups the different operations of the different objects together to generate the latest version of the requested chunk.

Figure 7:
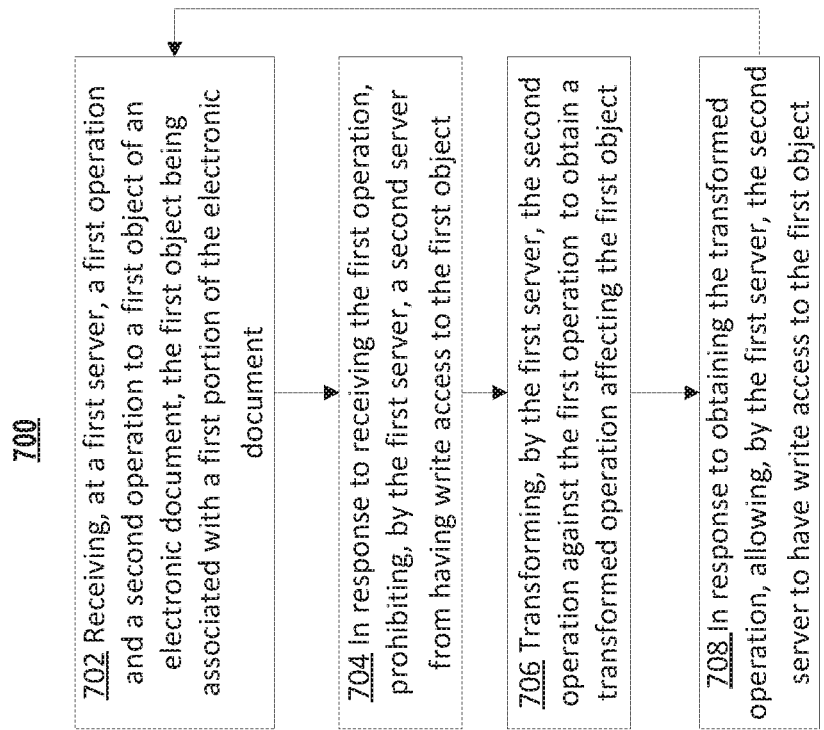
FIG. 7 is a flowchart of a method for receiving an operation to an object of an electronic document, according to an illustrative embodiment.

FIG. 7 is a flowchart of a process 700 that is performed by the server 104*a* when receiving an operation to an object 107, according to an illustrative embodiment. The first server 104*a* receives a first operation and a second operation to a first object 107, the first object 107 being associated with a first portion of master document 106 (step 702). In response to the receiving the first operation, the first server 104*a* prohibits a second server 104*b* from having write access to the first object 107 (step 704). The first server 104*a* then transforms the second operation against the first operation to obtain a transformed operation (step 706). In response to obtaining the transformed operation, the first server 104*a* allows the second server 104*b* to have write access to the first object (step 708).

At step 702, the first server 104a receives a first operation and a second operation to a first object 107 of the electronic master document 106. The first object 107 is associated with and belongs to a portion of the master document 107. In some embodiments, the operation is sent by the user device 113a in response to the initiation of a save command from a user, which is discussed in detail in relation to FIG. 3.

At step 704, the first server 104a prohibits a second server 104b from having write access to the first object 107. This means that the second server 104b is prohibited from making any transformations associated with the first object of the electronic document. This process may be referred to herein as acquiring a write access lock for the object 107 that is affected by the operation. In an example, acquiring the write access lock may be performed by adding the object identifier of the object 107 to a list of locked objects at the server 104a, which is described in detail in relation to FIG. 3. The write access lock effectively prohibits any other server to add operations to the operation history of object 107.

At step 706, the first server 104a transforms the second operation against the first operation to obtain a transformed operation. The process of applying the transformed operation to the operation history is discussed in detail in relation to FIGS. 2 and 3. Before an operation is applied to the operation history of an object 107, the first server 104a ensures that there are no conflicting pending operations to the object 107. If there are conflicting pending operations, these operations are transformed as discussed in relation to FIG. 2 to resolve any conflicts before the operations are applied to the operation history of the first object 107.

At step 708, the first server 104a allows the second server 104b to have write access to the first object 107 in response to obtaining the transformed operation. By relinquishing the write access lock to the first object 107, the other servers 104 and user devices 113 may update the operation history of the first object 107 by appending operations to the history. This process is accomplished by removing the object identifier of object 107 from the list of locked objects maintained at server 104a. This ensures that any other server 104 can access the operation history of object 107 to make edits to the operation history of the object 107.

Figure 8:
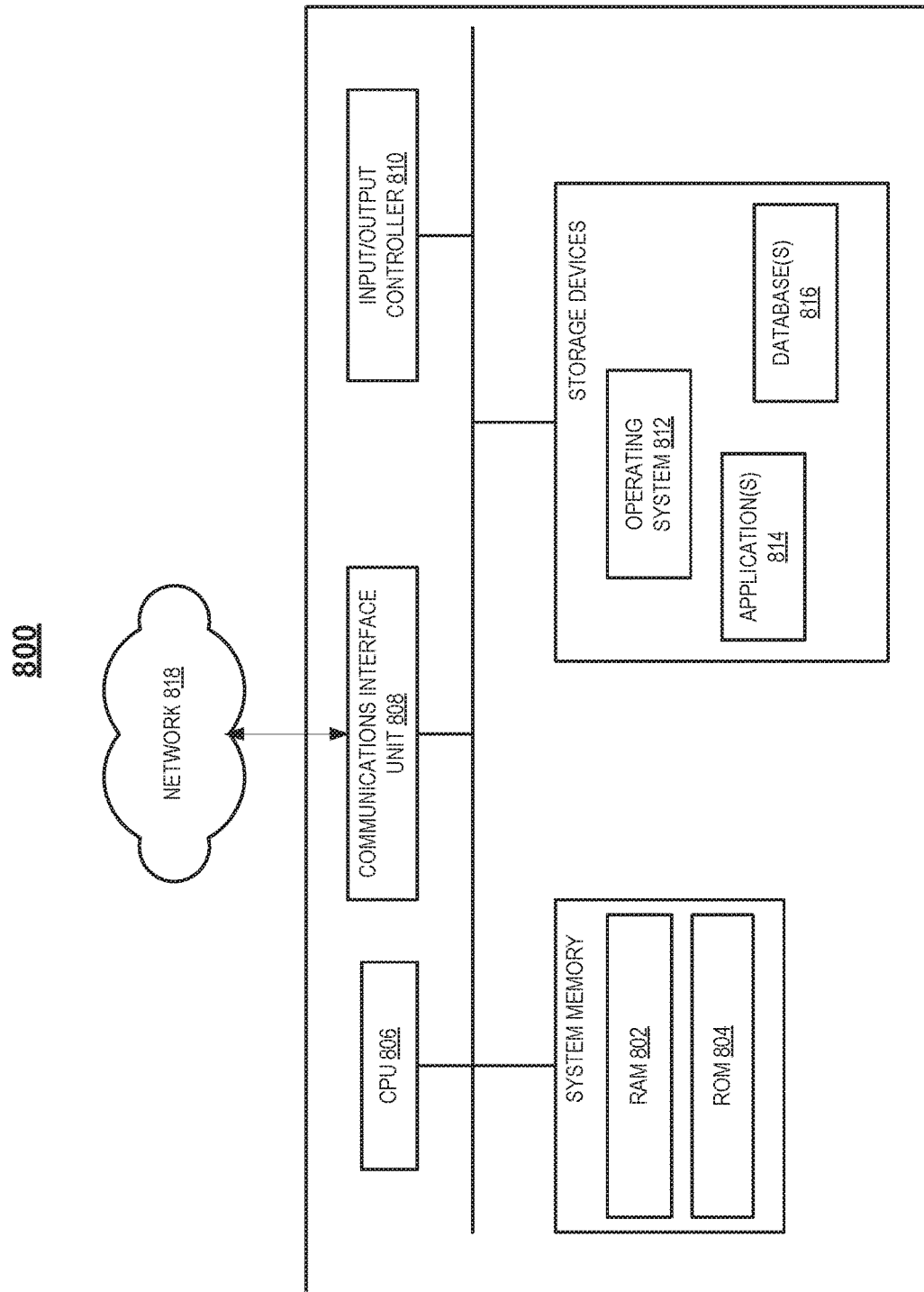
FIG. 8 is a block diagram of a computing device for performing any of the processes described herein, according to an illustrative embodiment.

FIG. 8 is a block diagram of a computing device, such as any of the components of the system of FIG. 1, for performing any of the processes described herein. Each of the components of these systems may be implemented on one or more computing devices 800. In certain aspects, a plurality of the components of these systems may be included within one computing device 800. In certain implementations, a component and a storage device may be implemented across several computing devices 800.

The computing device 800 comprises at least one communications interface unit, an input/output controller 810, system memory, and one or more data storage devices. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, A TP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A computer-implemented method comprising:
receiving, at a user device of a first user, a save request including a first operation and a second operation of the first user for an electronic document comprising a plurality of local objects stored at the user device;
identifying, by the user device, a first local object of the plurality of local objects that has been impacted by the first operation and a second local object of the plurality of local objects that has been impacted by the second operation, wherein the first local object is associated with a first object identifier and the second local object is associated with a second object identifier;
sending, by the user device, the first operation tagged with the first object identifier and a first version identifier of the first local object and the second operation tagged with the second object identifier and a second version identifier of the second local object to a server, wherein the first version identifier and the second version identifier indicate whether the first operation and the second operation are to be added to object histories of corresponding server-based objects stored at a network-based file storage system;
receiving, from the server, a third operation and a fourth operation of a second user for the electronic document, wherein the third operation is tagged with a third object identifier and a third version identifier of a first server-based object and the fourth operation is tagged with a fourth object identifier and a fourth version identifier of a second server-based object;
determining, based on a tag of the third operation and a tag of the fourth operations, that the first server-based object corresponds to the first local object and the second server-based object corresponds to the second local object, wherein the third version identifier is higher than the first version identifier and the fourth version identifier is higher than the second version identifier; and
applying the third operation to the first local object, and the fourth operation to the second local object.

2. The method of claim 1, wherein the first local object is associated with a first portion of a plurality of portions of the electronic document, and the second local object is associated with a second portion of the plurality of portions of the electronic document.

3. The method of claim 1, wherein the save request is initiated in response to an attempt of the first user to commit edits to the electronic document stored at the network-based file storage system.

4. The method of claim 1, wherein each of the first version identifier and the second version identifier is a client-based version identifier, each of the third version identifier and the third object identifier is a server-based version identifier.

5. The method of claim 4, wherein:
the first version identifier is updated when the first operation is applied to the first object, and is subsequently updated when the third operation is applied to the first object; and
the second version identifier is updated when the second operation is applied to the second object, and is subsequently updated when the fourth operation is applied to the second object.

6. The method of claim 4, wherein each server-based object has an object operation history including a complete list of operations applied to a corresponding server-based object.

7. The method of claim 6, wherein client-based version identifiers and server-based version identifier are used to define a sequence of updates to be committed to object operation histories of respective server-based objects.

8. A system for a user device of a first user, the system comprising:
a memory; and
a processor, coupled to the memory, to perform operations comprising:
receiving, at the user device, a save request including a first operation and a second operation of the first user for an electronic document comprising a plurality of local objects stored at the user device;
identifying, by the user device, a first local object of the plurality of local objects that has been impacted by the first operation and a second local object of the plurality of local objects that has been impacted by the second operation, wherein the first local object is associated with a first object identifier and the second local object is associated with a second object identifier;

sending, by the user device, the first operation tagged with the first object identifier and a first version identifier of the first local object and the second operation tagged with the second object identifier and a second version identifier of the second local object to a server, wherein the first version identifier and the second version identifier indicate whether the first operation and the second operation are to be added to object histories of corresponding server-based objects stored at a network-based file storage system;

receiving, from the server, a third operation and a fourth operation of a second user for the electronic document, wherein the third operation is tagged with a third object identifier and a third version identifier of a first server-based object and the fourth operation is tagged with a fourth object identifier and a fourth version identifier of a second server-based object;

determining, based on a tag of the third operation and a tag of the fourth operations, that the first server-based object corresponds to the first local object and the second server-based object corresponds to the second local object, wherein the third version identifier is higher than the first version identifier and the fourth version identifier is higher than the second version identifier; and applying the third operation to the first local object, and the fourth operation to the second local object.

9. The system of claim 8, wherein the first local object is associated with a first portion of a plurality of portions of the electronic document, and the second local object is associated with a second portion of the plurality of portions of the electronic document.

10. The system of claim 8, wherein each of the first version identifier and the second version identifier is a client-based version identifier, each of the third version identifier and the third object identifier is a server-based version identifier.

11. The system of claim 10, wherein:
the first version identifier is updated when the first operation is applied to the first object, and is subsequently updated when the third operation is applied to the first object; and
the second version identifier is updated when the second operation is applied to the second object, and is subsequently updated when the fourth operation is applied to the second object.

12. The system of claim 10, wherein each server-based object has an object operation history including a complete list of operations applied to a corresponding server-based object.

13. The system of claim 12, wherein client-based version identifiers and server-based version identifier are used to define a sequence of updates to be committed to object operation histories of respective server-based objects.

14. A non-transitory computer-readable medium comprising instructions, which when executed by a processor cause the processor to perform operations comprising:
receiving, at a user device of a first user, a save request including a first operation and a second operation of the first user for an electronic document comprising a plurality of local objects stored at the user device;
identifying, by the user device, a first local object of the plurality of local objects that has been impacted by the first operation and a second local object of the plurality of local objects that has been impacted by the second operation, wherein the first local object is associated with a first object identifier and the second local object is associated with a second object identifier;

sending, by the user device, the first operation tagged with the first object identifier and a first version identifier of the first local object and the second operation tagged with the second object identifier and a second version identifier of the second local object to a server, wherein the first version identifier and the second version identifier indicate whether the first operation and the second operation are to be added to object histories of corresponding server-based objects stored at a network-based file storage system;

receiving, from the server, a third operation and a fourth operation of a second user for the electronic document, wherein the third operation is tagged with a third object identifier and a third version identifier of a first server-based object and the fourth operation is tagged with a fourth object identifier and a fourth version identifier of a second server-based object;

determining, based on a tag of the third operation and a tag of the fourth operations, that the first server-based object corresponds to the first local object and the second server-based object corresponds to the second local object, wherein the third version identifier is higher than the first version identifier and the fourth version identifier is higher than the second version identifier; and applying the third operation to the first local object, and the fourth operation to the second local object.

15. The non-transitory computer-readable medium of claim 14, wherein the first local object is associated with a first portion of a plurality of portions of the electronic document, and the second local object is associated with a second portion of the plurality of portions of the electronic document.

16. The non-transitory computer-readable medium of claim 14, wherein each of the first version identifier and the second version identifier is a client-based version identifier, each of the third version identifier and the third object identifier is a server-based version identifier.

17. The non-transitory computer-readable medium of claim 16, wherein:
the first version identifier is updated when the first operation is applied to the first object, and is subsequently updated when the third operation is applied to the first object; and
the second version identifier is updated when the second operation is applied to the second object, and is subsequently updated when the fourth operation is applied to the second object.

18. The non-transitory computer-readable medium of claim 16, wherein each server-based object has an object operation history including a complete list of operations applied to a corresponding server-based object.

19. The non-transitory computer-readable medium of claim 18, wherein client-based version identifiers and server-based version identifier are used to define a sequence of updates to be committed to object operation histories of respective server-based objects.

* * * * *